June 30, 1970    K. WEBER    3,518,014
DEVICE FOR OPTICALLY SCANNING THE OBJECT IN A MICROSCOPE
Filed Aug. 7, 1967    5 Sheets-Sheet 4
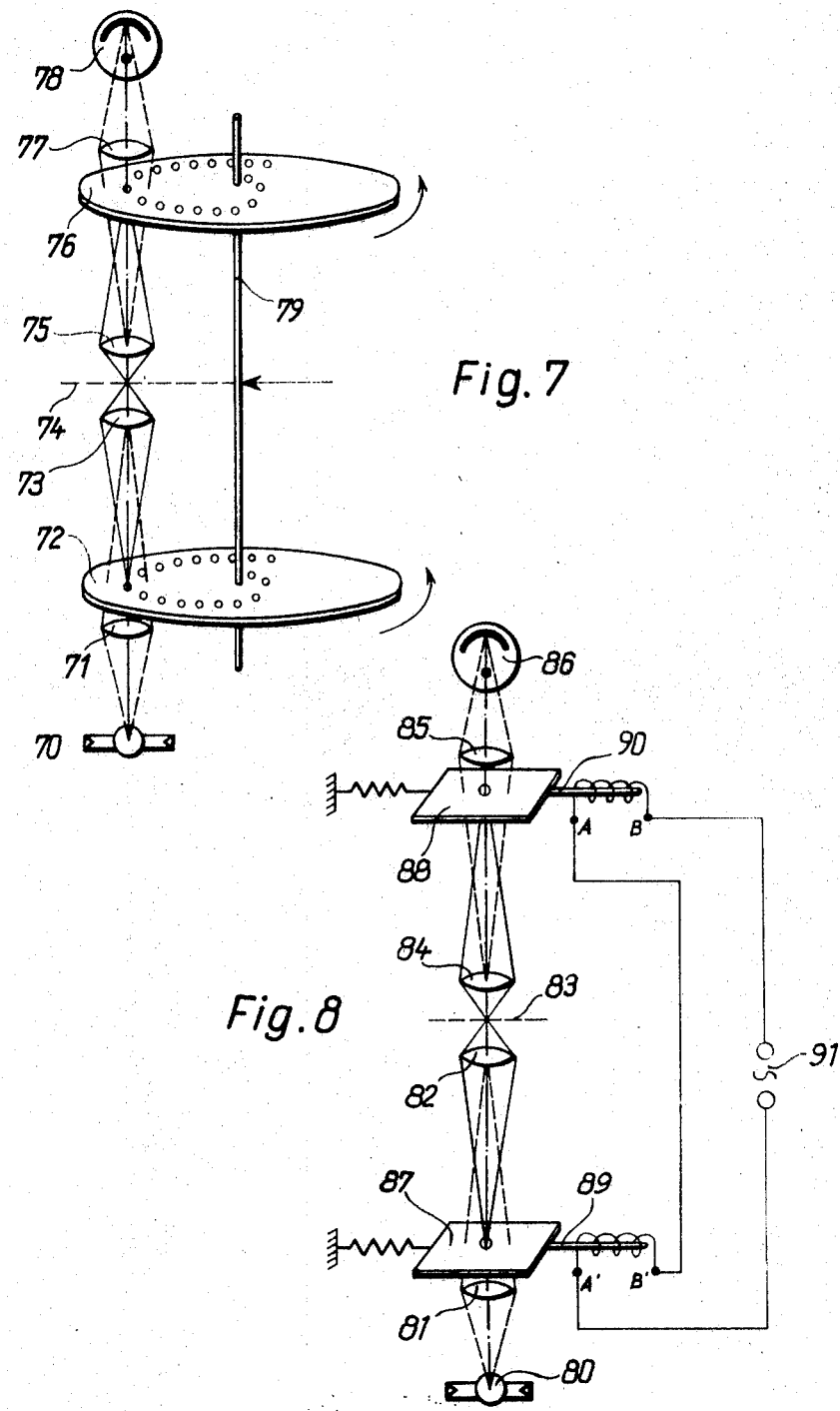
INVENTOR
KLAUS WEBER
BY *Krafft & Wells*
ATTORNEYS

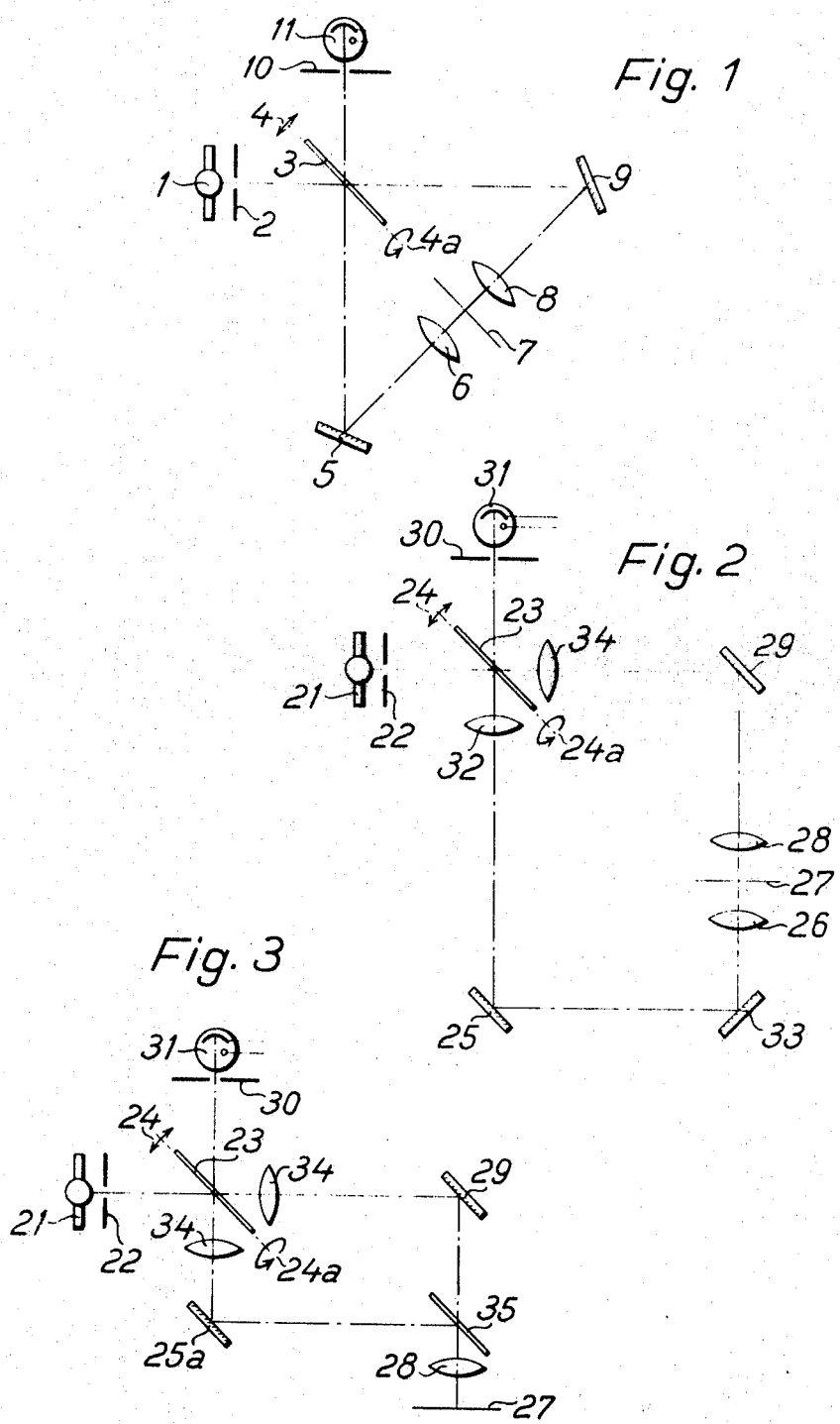

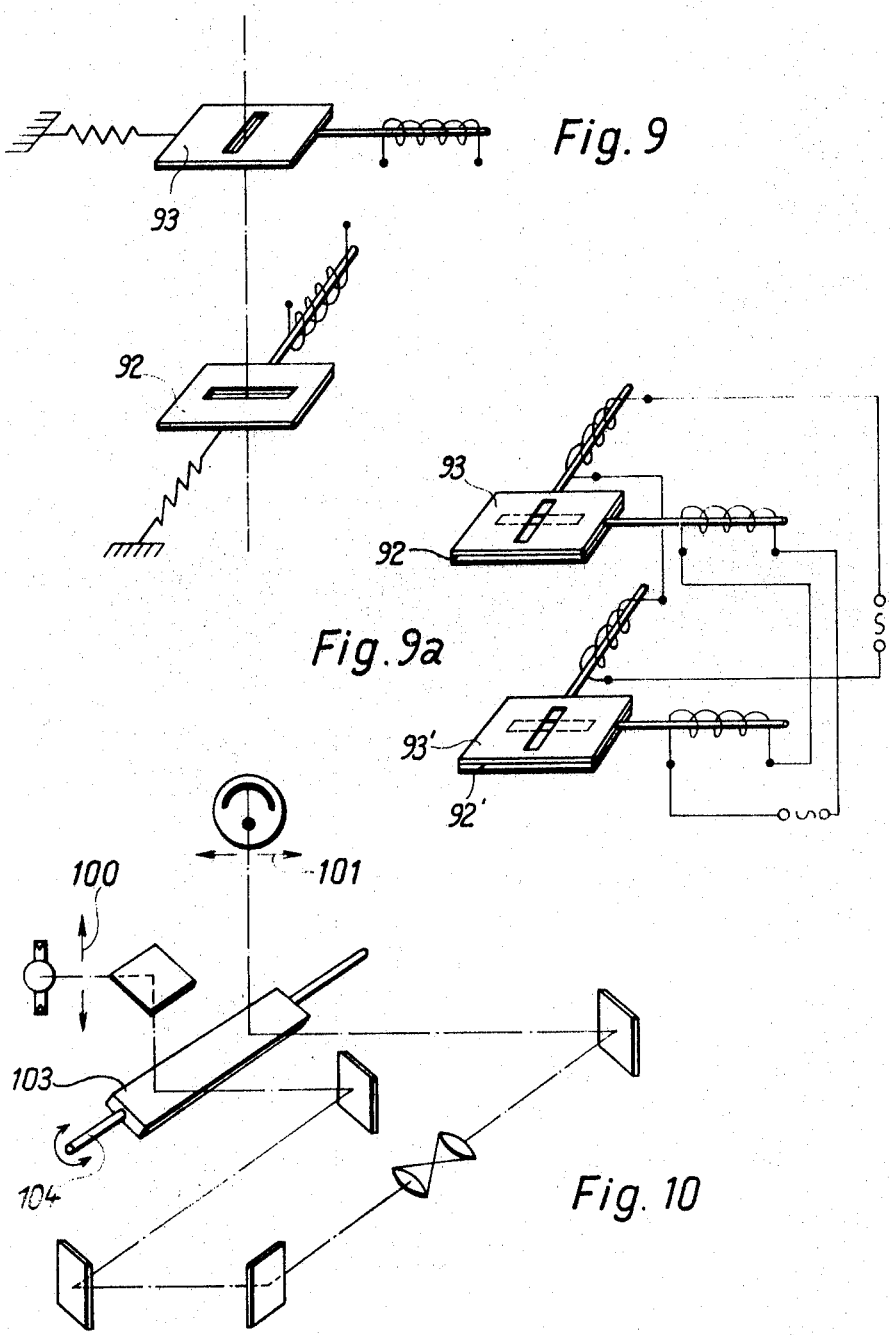

United States Patent Office 3,518,014
Patented June 30, 1970

3,518,014
DEVICE FOR OPTICALLY SCANNING THE OBJECT IN A MICROSCOPE
Klaus Weber, Wetzlar, Germany, assignor to Ernst Leitz G.m.b.H., Wetzlar, Germany
Filed Aug. 7, 1967, Ser. No. 658,896
Claims priority, application Germany, Aug. 10, 1966, L 54,285; Jan. 11, 1967, L 55,475
Int. Cl. G01n 21/06, 21/22
U.S. Cl. 356—203                                     11 Claims

ABSTRACT OF THE DISCLOSURE

In a microscope means are disclosed for determining the area of a specific object portion relative to the total object area.

Said means comprise a first means adapted to limit the illumination beam of the microscope light source to a small object portion to be measured, a second means adapted to limit the observation beam to the same small object portion to be measured, and, finally, a third means adapted to displace said first and second mentioned means synchronously.

In a first embodiment said first mentioned means and said second mentioned means consist of a Nipkow-disc each in the plane of the illumination field and in the plane of the field of view, both discs being mounted on a common shaft.

Another embodiment is disclosed wherein said first and second means consist of a diaphragm each in the plane of the illumination field and in the plane of the field of view, both diaphragms being provided with at least two corresponding holes and being displaceable with their motion electrically synchronized.

In a third disclosed embodiment said first and second means consist of a stationarily mounted diaphragm each in the plane of the illumination field and in the plane of the field of view. The means adapted to displace said diaphragm synchronously consists of one tilting mirror simultaneously disposed in the path of the illumination beam and in the path of the observation beam. By said mirror not the diaphragms are displaced, rather the images of said diaphragms are moved across the object in a scanning motion.

In connection with the last mentioned embodiment further means are disclosed, said means being adapted to automatically control an evaluation device and/or the tilting movement of said mirror.

CROSS-REFERENCE TO RELATED APPLICATIONS

Applicant claims priority under 35 U.S.C. 119 for applications L 54,285 IXa/42h, filed Aug. 10, 1966 and L 55,475 IXa/42h, filed Jan. 11, 1967 in the patent office of the Federal Republic of Germany.

BACKGROUND OF THE INVENTION

Field of the invention

The present invention relates to microscopes. More particularly, the invention pertains to a scanning device to be used with microscopes, said device being adapted to scan an object in order to evaluate the area of a specific section of the object. The device may also be used for determining the integral of the local extinction coefficient of the specimen for determining the amount of substance corresponding to this coefficient. A further mode of employment may be in interference microscopes for the determination of the integral of the local path differences of the specimen in order to determine its dry substance.

Description of the prior art

In order to analyze photometrically a section of particular interest in the specimen on a microscope it is common practice to isolate this particular section by means of diaphragms. By the latter only the section of interest is left free for illumination and observation with the rest of the specimen covered. This is done in order to prevent disturbing scattered light and irradiation.

It is, therefore, already known in the art to provide a stationary lamp diaphragm in the illumination field and also to provide a stationary diaphragm in the field of view. Between said two diaphragms the stage is displaced in a meandering motion. Since, however, the displacement of the stage with the object thereon lies well within ranges of depths of field being smaller than $1/\mu$ an extremely precise stage guidance is required. The velocity of the scanning motion being limited by the power of the acceleration forces during the change of the direction of displacement. Besides, if investigations are conducted by means of an interference microscope the displacement of the stage would easily disturb the phase relation between object beam and reference beam.

It has therefore already been suggested to perform the scanning operation on the image side of the microscope by means of a television equipment. A particular advantage of this method is the high speed with which the operation can be performed. On the other hand, a disadvantage exists in that no limiting of the illumination beam to the object section to be analyzed is possible. The whole field of view is constantly illuminated and is, moreover, required to be of uniform brightness in all its parts.

If, on the other hand, instead of a television equipment on the observation side of the microscope a flying-spot-tube is employed on the illumination side, the limitation to the object section to be analyzed will be possible only on the illumination side. However, while performing measurements of the absorption in transmitted light as well as while performing measurements of the reflection in incident light the ilumination aperture has to be reduced in order to attain a sufficient degree of exactness. During measurements of the absorption, for example, the aperture in general has to be smaller than 0.3. From this aperture results a scanning spot larger than 1 $\mu$m. in diameter, which often is too large for these kinds of measurements.

Further, optical scanning methods are known in the art, which comprise a limitation of the light beam to the object section to be measured on the illumination side of the microscope, which limited beam is then displaced across the object. This method has been performed by mechanical means, such as Nipkow-discs or tilting mirrors having a fixed field diaphragm. This method is advantageous over the flying-spot method because it may be used with a monochromator inserted between light source and object. It is a disadvantage, however, that on the observation side there is no limitation of the observation rays so that scattered light may occur, a further disadvantage being that the field of measurement often is too large owing to the aperture. Besides, in general this method works more slowly than the flying-spot method.

Like means have already been employed on the observation side of the microscope. Corresponding to the observation aperture a field of measurement as small as 0.2 $\mu$m. in diameter has been attained. However, the disadvantage of the constantly illuminated object field occurs here in the same way as was the case with the television method also requiring a uniform illumination of all parts of the object field.

SUMMARY OF THE INVENTION

It is the object of the present invention to provide a novel device which overcomes the above outlined disadvantages. According to the invention this object is achieved by providing means for synchronously scanning a limited section of the specimen on the illumination side and on the observation side of the microscope, thereby illuminating only this section of the specimen which at the same time is also scanned by the image of the measuring diaphragm moving across the object field.

With regard to the limited illumination beam and the limited observation beam the device according to the invention may be compared to the first mentioned prior art device comprising the meander-like displaced object stage. In contradistinction thereto the invented device, however, does not require a stage displacement, thus no mechanical and acceleration problems are encountered in the range of small dimensions and no disturbance of phase shifting can occur.

The synchronously scanning means provided may be of purely mechanical nature, such as two Nipkow-discs, one being disposed in the plane of the illumination field, the other one being arranged in the image field. The discs are mounted on a common shaft and are provided with corresponding apertures, the apertures of the illumination field discs, however, being larger in diameter.

According to another embodiment of the invention which also comprises mechanical means one diaphragm each is disposed in the plane of the illumination field and the image field. Both diaphragms being electrically synchronized and being synchronously displaceable in one direction only. The stage with the object is to be displaced continuously perpendicularly to the direction of the displacement of said diaphragms.

A further embodiment makes use of optical scanning means, i.e., of a tilting mirror which is displaced in the path of the illumination beam as well as in the path of the observation beam, thus producing a synchronous scanning motion of the illuminated spot on the object and of the image of the measuring diaphragm.

With regard to the last mentioned embodiment of the invention an additional device for controlling the evaluation means and the tilting means of the mirror is disclosed. Said device comprises means for generating a light beam. The light beam is directed onto said tilting mirror and is thereby reflected onto an auxiliary transparent plate on which the contour of the object section to be measured has been outlined previously by a separate process. The area outside of the contour is blackened and a photoelectric receiver is placed behind the plate. The tilting mirror reflects the control beam onto said plate. The beam transmits the plate and impinges on the photoelectric receiver thereby generating an electric signal in said receiver. If the beam happens to impinge on the blackened area no signal will be generated by the receiver. This change of the output signals is used for controlling the evaluation means as well as the tilting means of the mirror.

DESCRIPTION OF THE DRAWINGS

The various embodiments of the invention will be more readily comprehended from the following explanation in connection with the appending drawings, wherein:

FIG. 1 shows schematically the basic arrangement of elements in an embodiment wherein a tilting mirror is employed for synchronous scanning;

FIG. 2 is an illustration of said basic elements as used in a microscope of the transmitted illumination type;

FIG. 3 is an illustration of said basic elements as used in a microscope of the incident illumination type;

FIG. 7 shows schematically in a perspective view an embodiment wherein two Nipkow-discs are used as a means for synchronous scanning;

FIGS. 8 and 9a show schematically two embodiments wherein two electrically synchronized diaphragms are used as a means for synchronous scanning;

FIG. 9 is an exploded view of a portion of FIG. 9a and;

FIG. 10 shows schematically an embodiment wherein a tilting mirror is used for synchronous scanning, the illumination beam and the observation beam being reflected from the same side of the mirror.

In FIG. 1 a light source 1 illuminates a diaphragm 2. The light beam transmitting said illumination diaphragm 2 impinges on a tilting mirror 3 which may be tilted in the direction of the double-arrow 4 about an axis located in the mirror surface and extending perpendicular to the optical axis. The light beam is reflected to the stationary mirror 5 and further to the condenser 6. Above said condenser the stage with the object plane 7 is located wherein an image of the illumination diaphragm 2 is produced.

Figure 4:
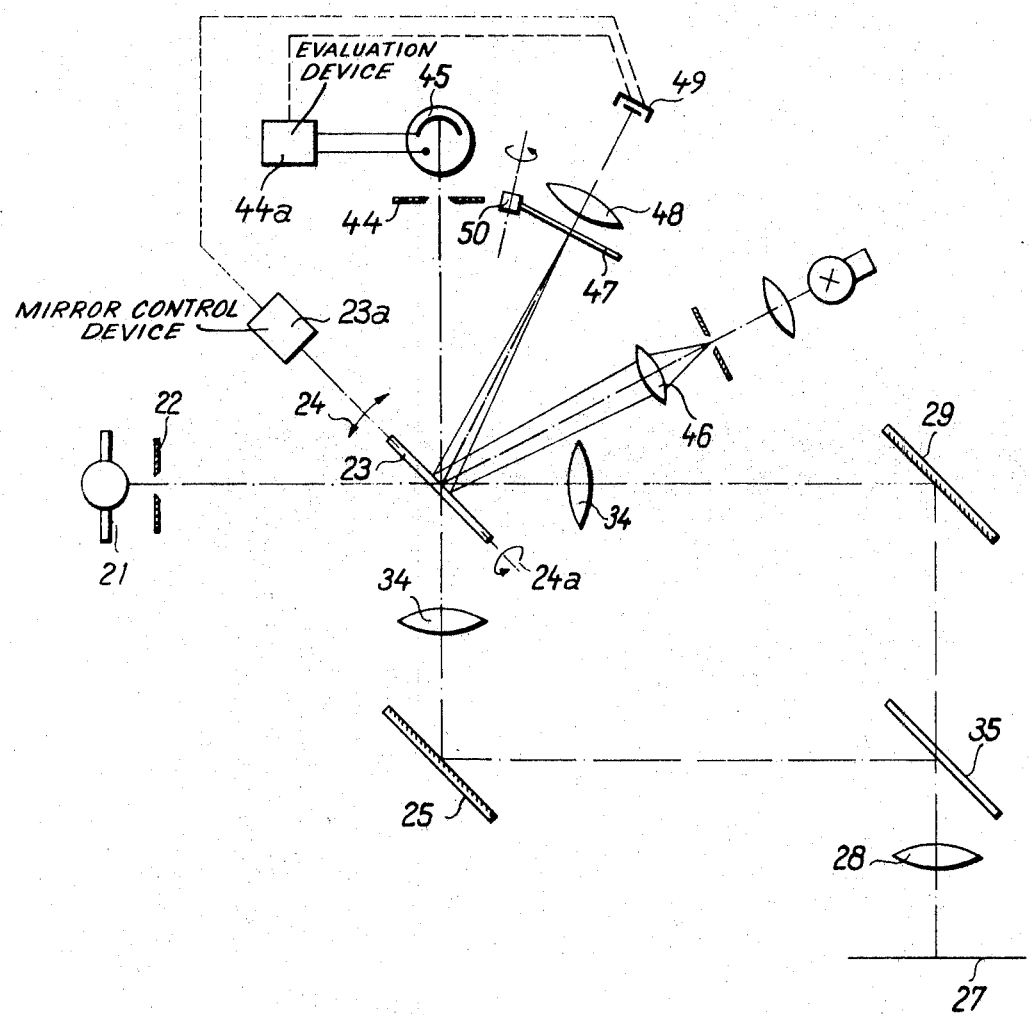
FIG. 4 shows a modification of an arrangement according to FIG. 3 wherein in addition a control device is employed.

The objective 8 is disposed above object plane 7 imaging the object (not shown) by means of stationary mirror 9 and the reverse side of tilting mirror 3 in the image plane where the field diaphragm 10 is located.

As is well known to those skilled in the microscopic art an ocular is arranged in a plane corresponding to the plane of the field diaphragm. This ocular has been omitted in the present illustration for sake of simplicity. Behind the field diaphragm 10 a photoelectric receiver 11 is disposed.

Besides being adapted to perform a tilting motion in the direction of double-arrow 4 mirror 3 may also be pivoted in the direction of circular arrow 4a, perpendicular to the first mentioned tilting motion.

The elements as described above in connection with FIG. 1 are the basic elements which are likewise empolyed in a series of modifications of a first embodiment of the invention wherein two stationary diaphragms are used and the images of said diaphragms are displaced synchronously by means of tilting mirror 3.

In FIG. 2 said basic arrangement is modified to be suitable particularly for microscopes of the transmitted illumination type. A light source 21 and an illumination diaphragm 22 are provided. An image of said diaphragm is produced in the object plane 27 by means of tilting mirror 23, auxiliary system 32, two stationary reflecting elements 25 and 33, one of them being a roof prism, and a condenser 26. The tilting mirror 23, again, being tiltable in the direction of double-arrow 24 and being pivotable in the direction of circular-arrow 24a. As already described with reference to FIG. 1 the object is imaged by objective 28, mirror 29, auxiliary system 34 and tilting mirror 23 on field diaphragm 30. Behind the latter in the direction of light rays the photoelectric receiver 31 is disposed.

By introducing an additional mirror 25a and a semitransparent mirror 35 as illustrated in FIG. 3 the device shown in FIG. 2 may be modified for use with incident light.

FIG. 4 shows an arrangement corresponding basically to the device depicted in FIG. 3. However, additional control means are incorporated therein. Said means comprise an auxiliary plate 47 on which the contour of the object to be measured is outlined and the remaining plate portions are obscured. Particularly in case of recesses in the object contour or in case of object areas which are not interconnected it may be of advantage not only to outline the object contour but also to blacken the surrounding area. Plate 47 is transparent, preferably a glass plate, and a photoelectric receiver 49 is provided behind said plate.

A collimator 46 projects a light beam onto said auxiliary plate 47 via tilting mirror 23 and further through field lens 48 to receiver 49. Receiver 49 is connected to evaluation device 44a and is also connected to mirror control device 23a of tilting mirror 23 in a manner known per se.

The above described control device functions in the following way: Owing to the tilting motion of mirror 23 the image produced by the objective 28 and the auxiliary system 34 is moved zigzag-wise across the aperture of diaphragm 44. The aperture-transmitting light generates in every instant an electric signal upon reaching the photoelectric receiver 45.

Synchronously to the motion of the object image across diaphragm 44 the light beam emitted by collimator 46 and projected onto plate 47 by mirror 23 is moved in a corresponding motion across said plate. The light beam transmits through plate 47 and reaches the receiver 49 whenever the light beam travels across uncovered spots of the plate. If, however, the light impinges on the outlined contour of the object to be measured, which contour consists of nontransmitting ink or like material, the light is blocked from reaching the receiver. Consequently the output signal of said receiver varies. This variation of the output signal is used to control the evaluation device 44a in a way as to switch off said device whenever no light reaches the receiver 49, and to switch the device on again when the light again impinges on said receiver. On the other hand said variation of output signals is made use of to control the direction of displacement of tilting mirror 23. Thereby, for example, reversing the tilting motion as indicated by double-arrow 24 and at the same time causing a pivoting motion in the direction of circular arrow 24a by which the image position on diaphragm 44 as well as the position of the light beam on plate 47 is displaced by an adequate fraction. In order to meet this requirement of the tilting and pivoting motions mirror 23 may be suspended on gimbals.

Figure 5:
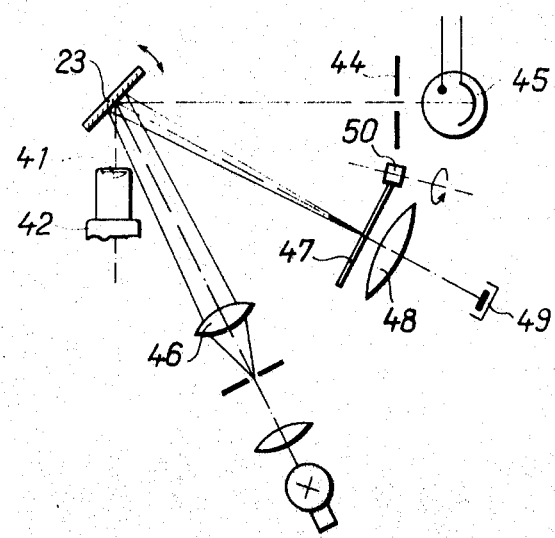
FIGS. 5 and 6 illustrate two functions in using and preparing said control device.
Figure 6:
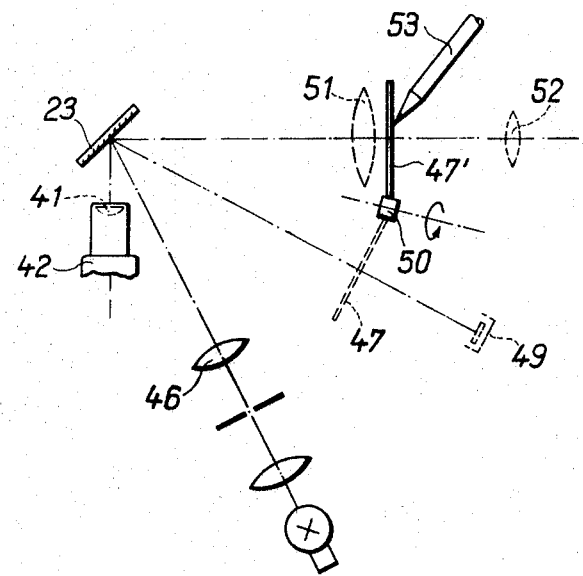

As mentioned above it is previously necessary to outline the contour of the object to be measured on plate 47. This can be done, as illustrated in FIGS. 5 and 6, by turning plate 47 into the observation rays of the microscope. To this end a shaft 50 is disposed between said observation rays and the light beam from collimator 46. By turning plate 47 about said shaft the plate is placed in the position otherwise occupied by diaphragm 44 (FIG. 6). Additionally a field lens 51 and a magnifier 52 are provided in front of and behind plate 47 respectively. By means of a pencil writing on glass the contour of the object to be measured may then be drawn on plate 47 while visually observing the object image. By turning plate 47 back into the scanning position an inversion of horizontal and vertical sides takes place. It is thereby ensured that during the scanning performance the position of the light beam on plate 47 always corresponds to the position of the object image on the aperture of diaphragm 44. If, for instance, mirror 23 is pivoted in a counterclockwise direction the light beam on plate 47 will be displaced to the upper rim of said plate where, as a result of height inversion, the lower side of the object contour is located. At the same time the object image will be moved across diaphragm 44 in an upward direction consequently bringing the lower side of the object image into alignment with the diaphragm aperture.

Should the microscope image be sufficiently bright the outlining of the contour may also be performed by disposing a ground glass in the image plane of the microscope. Said ground glass is then used instead of field lens 51 and magnifier 52. Plate 47 on which the contour is actually outlined may consist of a foil which may be kept in store as a record of the measurement.

In order to limit the area to be blackened as far as possible a rectangular or iris diaphragm may be employed in order to cover the rim zones on plate 47. If objects of almost circular or rectangular shape are to be measured circular or rectangular diaphragms alone may, of course, be employed.

If more than one object portion to be measured is comprised in the viewing field a reversed control method may sometimes be more advantageous. That is to say the object areas to be measured are blackened on plate 47 and the surrounding areas are left transparent. To this end a filter of blue colour may be inserted in front of mirror 49 and the object area may be covered in yellow or red.

In addition to the above mentioned usages to which the output signals of receiver 49 may be put, said signals may also be employed for measuring the scanned area. This area simply is the product of the sum of all scanned lines across the object multiplied by the distance of the single lines.

In FIG. 7 an embodiment of the invention is depicted wherein two Nipkow-discs are employed. Above a light source 70 is arranged a field lens 71 and a disc 72. The latter serves as an illumination diaphragm. Under the object plane 74 a condenser 73 is provided which projects an image of the disc-apertures into the object plane. An objective 75 is next along the optical axis, said objective imaging the illuminated portion of the object into the plane of the field diaphragm in which a second disc 76 is arranged. Above the latter is arranged the field lens 77 and the photoelectric receiver 78.

Both discs 72, 76 are mounted on a common shaft 79 with their holes in mutual alignment. By rotating shaft 79 said holes are thus moved synchronously across the object disposed in the object plane 74. While in the embodiments illustrated in FIGS. 1 through 6 the lamp diaphragm and the field diaphragm remain stationary and only their images are displaced, in the present embodiment it is the diaphragms themselves that are moved synchronously across the object.

In a further embodiment shown in FIG. 8 also the diaphragms themselves are displaced in an oscillating motion. The lamp source 80, field lens 81, condenser 82, object plane 83, objective 84, field lens 85, and photoelectric receiver 86 are arranged in a manner corresponding to the embodiment of FIG. 7. The two Nipkow-discs, however, are replaced by two diaphragms 87, 88 having apertures in them which are in alignment. Both diaphragms are linked to the cores of solenoids 89, 90 which are connected to a current source 91. The diaphragms are thus synchronously displaceable by electromagnetical means. This displacement, however, extends in one direction only. In order to perform the scanning procedure in a direction perpendicular to the direction of displacement of the diaphragms, i.e., in the direction of the second coordinate, the stage has to be displaced continuously in this second direction.

This disadvantage can readily be overcome if each one of the diaphragms 87, 88 is replaced by to slit-diaphragms 92, 93 as depicted in FIG. 9 in an exploded view. The slits extend in directions perpendicular to each other and, if placed one upon the other, define a small rectangular aperture through which the light may transmit. Each diaphragm is mounted on the core of a separate solenoid, both diaphragms being thus displaceable in directions normal to each other.

The coils of the two corresponding solenoids in the plane of the illumination diaphragm and in the plane of the field diaphragm are connected in series as may be seen from FIG. 9a. Thus the two corresponding diaphragms may by electromechanical means be synchronously displaced in one direction, whereas the other two diaphragms may be displaced in the direction of the other coordinate. Consequently any movement of the stage or the object can be dispensed with.

A final embodiment which is much related to those of FIGS. 1 through 6 is depicted in FIG. 10. As in the embodiments of the figures referred to the illumination diaphragm 100 and the field diaphragm 101 are mounted stationary, while the images of said diaphragms are displaced synchronously by means of a tilting mirror 103. However, while in each embodiment of the FIGS. 1–6 both sides of the tilting mirror are used for reflecting purposes (one side for the illumination beam and the reverse side for the observation beam) only the front of mirror 103 serves for reflecting both beams. In order to render this embodiment suitable also for a scanning motion in the direction of the second coordinate the light path of the illumination beam and the observation beam must be disposed close together and by means of auxiliary lenses a parallel light path must be established.

I claim:

1. A device for optically scanning the object in a microscope comprising:
   a rigidly mounted illumination diaphragm for limiting the illumination beam emitted by the microscope light source to a small spot in the object to be measured;
   a rigidly mounted field diaphragm for limiting the observation beam to the same small spot in the object to be measured; and
   a tilting mirror in the path of the illumination beam as well as in the path of the observation beam for displacing said illumination beam and said observation beam synchronously and thereby synchronously changing said small spot in the object to be measured.

2. A device according to claim 1, wherein said tilting mirror is pivotable about one axis located in the surface plane of said mirror and extending perpendicular to the optical axis defined by said illumination and field diaphragms.

3. A device according to claim 1, wherein said tilting mirror is pivotable about two axes located in the surface plane of said mirror, the first one of said axes extending perpendicular to the optical axis defined by said illumination and field diaphragms, the second axis extending perpendicular to said first axis.

4. A device according to claim 1, wherein the front side of said mirror reflects said illumination beam as well as said observation beam.

5. A device according to claim 1, wherein said illumination beam is reflected by one side of said mirror and said observation beam is reflected by the back of said mirror.

6. A device according to claim 1 and further comprising:
   an additional light source, said source emitting an additional beam of light onto said tilting mirror;
   an auxiliary plate in the path of said beam after reflection by said mirror, said plate being suitable for outlining the contour of the object section to be measured;
   a photoelectric receiver disposed behind said plate, the output signals of said receiver controlling the evaluation device and the driving device of said mirror.

7. A device according to claim 6, wherein said auxiliary plate is pivotable about an axis, thereby being alternately positionable in the path of the observation beam and in the path of said additional beam after reflection by said mirror.

8. A device for optically scanning the object in a microscope, said device comprising:
   a first means for limiting the illumination beam admitted by a microscope light source to a small spot in the object to be measured;
   a second means for limiting the observation beam to the same small spot in the object to be measured; and
   a third means for displacing said first and second means for displacing said first and second means synchronously, wherein the object remains stationary during scanning and the illuminating spot and observation spot are scanned synchronously through the object.

9. A device according to claim 8, wherein said first means and said second means consist of a Nipkow-disc each, said discs provided with a plurality of corresponding apertures, and wherein said third means consists of a shaft whereon both of said first and second means are rigidly mounted, said shaft displacing said Nipkow-discs synchronously across said object.

10. A device according to claim 8, wherein each of said first means and said second means consist of a diaphragm each, said diaphragm provided with at least two corresponding apertures, one in each diaphragm, and wherein said third means comprises electrically controllable means for displacing said diaphragms synchronously across the object.

11. A device according to claim 10, wherein each of said diaphragms consist of two slit-diaphragms, the slits of said diaphragms extending perpendicular to each other.

References Cited

UNITED STATES PATENTS

| | | | |
|---|---|---|---|
| 2,772,598 | 12/1956 | Hotine | 356—217 |
| 3,013,467 | 12/1961 | Minsky | 356—203 |
| 3,297,873 | 1/1967 | Hovnanian et al. | 250—234 |

RONALD L. WIBERT, Primary Examiner

V. P. McGRAW, Assistant Examiner

U.S. Cl. X.R.

350—90, 91